May 12, 1931.     R. M. MEUNIER     1,804,634
ADJUSTABLE SHADE
Filed Feb. 3, 1930
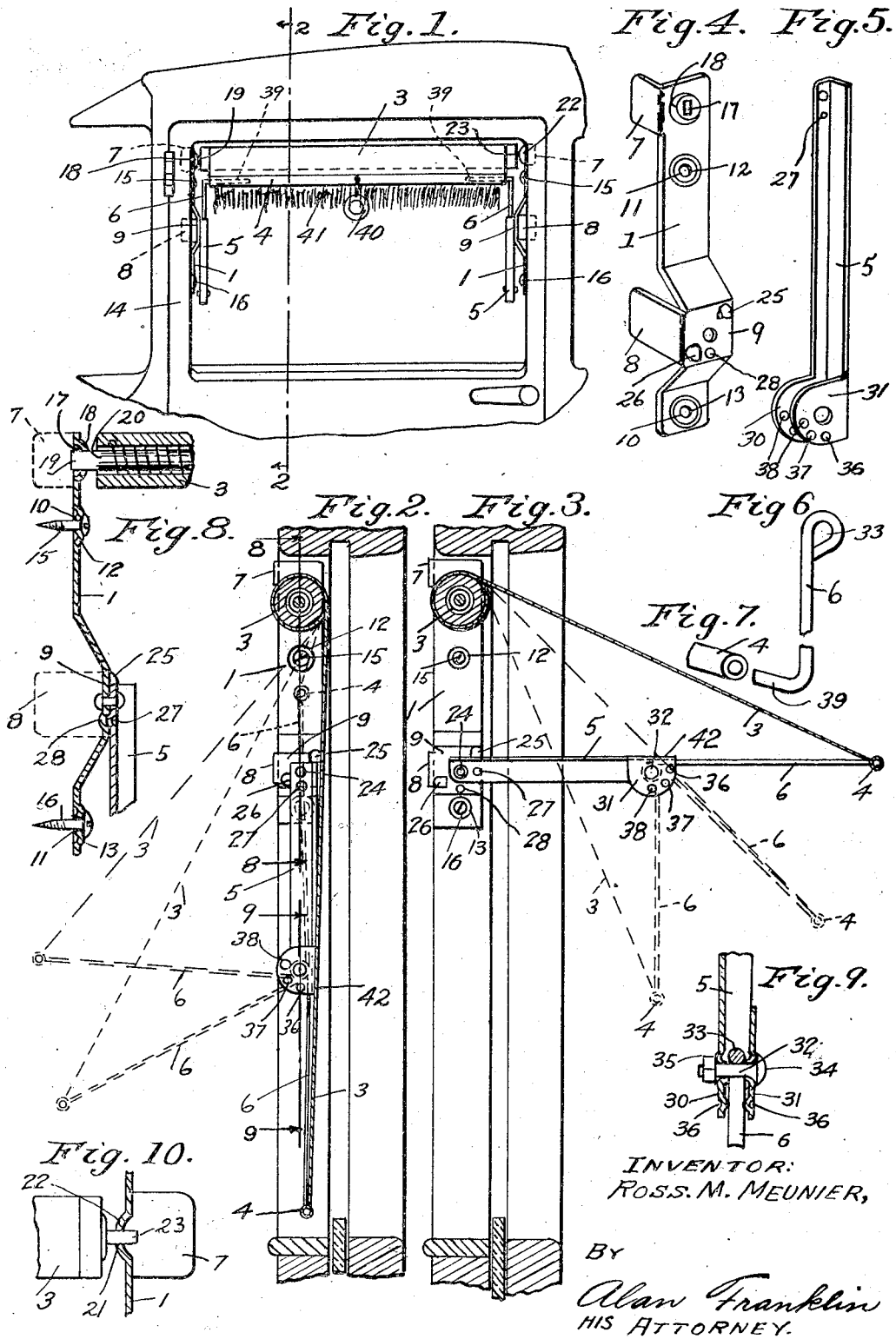
INVENTOR:
ROSS. M. MEUNIER,
BY
Alan Franklin
HIS ATTORNEY.

Patented May 12, 1931

1,804,634

UNITED STATES PATENT OFFICE

ROSS M. MEUNIER, OF GLENDALE, CALIFORNIA

ADJUSTABLE SHADE

Application filed February 3, 1930. Serial No. 425,456.

This invention is an adjustable shade, particularly applicable to automobile windows.

One of the objects of the invention is to provide an improved shade which will effectively protect the occupants of an automobile from the sun and the elements.

Another object is to provide a shade of the character stated which may be readily adjusted at various angles as desired.

Another object is to provide an adjustable automobile shade which may be used as a wind visor or deflector inside of an automobile for deflecting and circulating air therein.

Another object is to provide a shade of the character stated which may be used as an ordinary window shade, as an outside awning or as an inside wind visor or deflector.

A further object is to provide a shade of the character stated which will be simple in construction, economical to manufacture, easy to manipulate and efficient in operation.

Other objects and advantages will appear hereinafter.

The invention is illustrated in the annexed drawings which form a part of this specification and in which, Fig. 1 is a side elevation of my shade shown applied to an automobile window.

Fig. 2 is a vertical cross section of Fig. 1 taken on line 2—2, showing the shade drawn down in full lines and showing in dotted lines the shade rolled up completely and rolled up partly and extended inwardly of the window at different angles.

Fig. 3 is a view like Fig. 2 except that the shade is shown partly drawn and extended outwardly of the window at different angles.

Fig. 4 is a perspective of one of the supporting brackets.

Fig. 5 is a perspective of one of the supporting arms.

Fig. 6 is a perspective of one of the shade adjusting arms.

Fig. 7 is a perspective of one end of the shade end pull rod shown in position to receive the bent end of a shade adjusting arm.

Fig. 8 is a vertical section taken on line 8—8 of Fig. 2.

Fig. 9 is a sectional view taken on line 9—9 of Fig. 2.

Fig. 10 is a fragmentary side view of one end of the shade roller and sectional view of the bracket bearing in which the shade roller trunion is journaled.

Corresponding parts are designated by the same reference characters in all the figures.

My invention comprises primarily a pair of brackets 1 and 2, free spring roller shade 3 such as a Hartshorn roller shade, a tubular shade end pull rod 4, a pair of supporting arms 5, and a pair of adjustable shade holding arms 6.

The brackets 1 and 2 are formed with ears 7 and 8 extending from the inner edges thereof at right angles thereto, the brackets being offset at 9 from which offsets the ears 8 extend. The brackets are also formed with screw openings 10 and 11 and are embossed and reinforced around said openings to form screw seats 12 and 13. The brackets 1 and 2 are placed against the inner vertical edges of the frame of an automobile window 14 in the upper part of the window with the ears 7 and 8 against the inside of the window (Figs. 2 and 3) and the brackets are secured in such position to the window frame by screws 15 and 16 driven through the bracket openings 10 and 11 respectively, the heads of said screws engaging the seats 12 and 13 respectively and firmly holding the brackets in position on the window frame.

In the upper end of the bracket 1 is provided a flat-sided opening 17 and the bracket is embossed around said opening as at 18 to reinforce the bracket at said opening and to receive the flat end 19 of the shade roller gudgeon 20. The upper end of the bracket 2 is provided with an opening 21 and the bracket is embossed around said opening to reinforce the bracket at said opening and to form a bearing 22 in which the shade roller trunnion 23 is journaled.

The supporting arms 5 may be made of angle iron and are fulcrumed at one end on pivots 24 to the offsets 9 of the brackets 1 and 2 respectively. Stops 25 are pressed out of the bracket-offsets for engaging the arms 5 for limiting the outward and upward swinging movement of the arms in a horizontal position (Fig. 3). Stops 26 are pressed out of the bracket-offsets for engaging the arms 5 for limiting the inward and downward swinging movement of the arms in a vertical position (Fig. 2). Detents 27 are pressed out of the arms 5 for engaging sockets 28 impressed in the bracket offsets 9 for holding the arms against outward movement unless a little force is applied thereto.

A pair of ears 30 and 31 are formed in spaced relation on the supporting ends of the arms 5, between which ears one end of the adjusting arms 6 are fulcrumed on pivot bolts 32 which extend through said ears and through eyes 33 formed on one end of the adjusting arms 6, the heads 34 of said bolts engaging the outside of ears 33 while nuts 35 are screwed on the ends of the bolts against the outside of ears 31. Detents 36 and 37 and 38 are pressed inwardly from the ears 30 and 31 for respectively engaging the adjusting arms 6 and holding said arms, adjusted to three different positions respectively with relation to the supporting arms 5, until a little force is applied to the arms for swinging said arms with relation to the supporting arms in the manner and for the purpose hereinafter described. The outer swinging ends of the adjusting arms 6 are bent at right angles as at 39 and are inserted in the ends respectively of the tubular shade end pull rod 4. A pull ring 40 is connected by a cord 41 to the end of the shade 3 for operating the same.

The operation of my invention is as follows:

The shade when not in use is wound up on its roller in the top of the window in which position of the shade the supporting arms 5 are arrested in a vertical position by the stops 26 while the adjustable shade holding arms 6 are folded up upon the arms 5 as shown in dotted lines in Fig. 2. The shade may be lowered by swinging the arms 6 inwardly, with relation to the car, and downwardly into the full line position of the shade, arms 5 and arms 6 as shown in Fig. 2, in which lowered position the shade is arrested by the engagement of the detents 27 with the sockets 28 (Figs. 2 and 7) and by the engagement of the arms 6 with the lower end of the angle iron flanges 42 of the supporting arms 5. The shade may be lowered part way to different lengths and swung inwardly of the car by means of the arms 6 in which positions the shade may be held by the engagement of the arms with detents 37 or 38, for partly shading the occupants of the car and for deflecting air into the car under the shade so that the air will circulate in the car.

The shade may be swung outwardly and upwardly from its lowered position into different angular positions for protecting the occupants of the car against the sun and the elements as shown in Fig. 3 in which positions the shade is held by its spring, so that the arms 6 engage either the end parts 42 of arms 5 (as shown in full lines in Fig. 3) or the detents 36 and 37 or detents 37 and 38 as shown in dotted lines in said figure.

I do not limit my invention to the exact construction herein disclosed because various changes may be made therein without departing from the spirit of the invention.

I claim as my invention:

1. An adjustable shade for windows comprising a free roller shade, supporting arms, means for pivotally mounting said supporting arms on a window frame, adjustable shade holding arms pivotally mounted on the swinging ends of said supporting arms and connected at their outer ends to the outer end of the shade, means for limiting the downward movement of said supporting arms in vertical position, means for limiting the upward movement of said supporting arms in horizontal position, and means for positively holding said adjustable shade-holding arms either in longitudinal alignment with or at an angle to said supporting arms.

2. An adjustable shade for windows comprising a free roller shade, supporting arms, means for pivotally mounting said supporting arms on a window frame, adjustable shade-holding arms pivotally mounted on the swinging ends of said supporting arms and connected at their outer ends to the outer end of the shade means for yieldably holding said supporting arms in vertical position, means for limiting the upward movement of said supporting arms in horizontal position, and means for positively holding said adjustable shade-holding arms either in longitudinal alignment with or at an angle to said supporting arms.

3. An adjustable shade for windows comprising a free roller shade, supporting arms, means for pivotally mounting said supporting arms, on a window frame, adjustable shade-holding arms pivotally mounted on the swinging ends of said supporting arms and connected at their outer ends to the outer end of the shade, means for limiting the downward movement of said supporting arms in vertical position, means for limiting the upward movement of said supporting arms in horizontal position, and means for holding said adjustable shade-holding arms either in longitudinal alignment with or at various angles to said supporting arms.

4. An adjustable shade for windows comprising a free roller shade, supporting arms, means for pivotally mounting said supporting arms on a window frame, adjustable shade holding arms pivotally mounted on the swinging ends of said supporting arms, the ends of said adjustable shade-holding arms being bent, a tubular pull rod in the end of said shade the ends of which rod receive the bent ends of said adjustable shade-holding arms, means for holding said supporting arms in vertical position, means for limiting the upward movement of said supporting arms in horizontal position and means for positively holding said adjustable shade-holding arms either in longitudinal alignment with or at an angle to said supporting arms.

5. In combination with a window frame, a pair of brackets mounted in said frame, a free roller shade mounted in said brackets, a pair of supporting arms pivoted to said brackets, stops on said brackets for limiting the movement of said arms in vertical or in horizontal position, adjustable shade-holding arms pivoted in the swinging ends of said supporting arms and connected at their outer ends to the outer ends of the shade, and means for positively holding said adjustable shade-holding arms in longitudinal alignment with or at an angle to said supporting arms.

6. An adjustable shade for windows comprising a free roller shade, supporting arms, means for pivotally mounting said supporting arms on a window frame, ears on the swinging ends of said supporting arms, adjustable shade-holding arms pivoted to said ears and connected at their outer ends to the end of the shade, means for limiting the movement of said supporting arms in vertical or horizontal position, and detents on said ears for engaging and holding said adjustable shade-holding arms either in longitudinal alignment with or at an angle to said supporting arms.

7. In combination with a window frame, a pair of brackets mounted in said frame and formed with detent sockets, a free roller shade mounted in said brackets, a pair of supporting arms pivoted to said brackets, detents formed in said arms for engaging said sockets for holding said arms in vertical position, means for limiting the movement of said arms in horizontal position, a pair of adjustable shade-holding arms pivotally mounted on the swinging ends of said supporting arms and connected at their outer ends to the end of the shade, and means for holding said adjustable shade-holding arms in longitudinal alignment with or at an angle to said supporting arm.

ROSS M. MEUNIER.